United States Patent [19]

Wilhelm et al.

[11] Patent Number: 4,728,250

[45] Date of Patent: Mar. 1, 1988

[54] PROCESS OF FILLING AND EMPTYING A CONSTANTLY PRESSURIZED CONTAINER

[75] Inventors: Joachim Wilhelm, Frankfurt; Rainer Reimert, Idstein, both of Fed. Rep. of Germany

[73] Assignee: Metallgesellschaft Aktiengesellschaft, Frankfurt am Main, Fed. Rep. of Germany

[21] Appl. No.: 909,134

[22] Filed: Sep. 18, 1986

[30] Foreign Application Priority Data

Sep. 18, 1985 [DE] Fed. Rep. of Germany ....... 3533202

[51] Int. Cl.⁴ .................. B01J 3/00; C11B 1/10; B01D 11/02
[52] U.S. Cl. .................. 414/786; 406/146; 414/221; 422/232
[58] Field of Search .............. 414/217, 221, 288, 290, 414/292, 298, 786; 406/24, 25, 124–126, 146; 422/219, 232; 210/499

[56] References Cited

U.S. PATENT DOCUMENTS

| | | | |
|---|---|---|---|
| 2,713,949 | 7/1955 | Stevenson | 414/217 |
| 2,926,802 | 3/1960 | Stuewer | 414/217 X |
| 2,985,324 | 5/1961 | Balentine | 414/217 |
| 3,057,697 | 10/1962 | Hanmer | 422/232 X |
| 3,729,105 | 4/1973 | Huebler et al. | 414/221 X |
| 3,762,773 | 10/1973 | Schroeder | 406/146 X |
| 4,247,240 | 1/1981 | Schora, Jr. et al. | 422/232 X |
| 4,401,402 | 8/1983 | Casperson | 414/221 X |

*Primary Examiner*—Robert J. Spar
*Assistant Examiner*—David A. Bucci
*Attorney, Agent, or Firm*—Karl F. Ross; Herbert Dubno

[57] ABSTRACT

A method of filling a container continually under superatmospheric pressure with flowable granular solids and removing the solids from the container utilizing entrance and discharge locks provided for liquid filling of the locks, gas-pressure equalization between the locks and liquid transfer from the entrance to the discharge lock. A liquid/solid separator is provided for the outflow from the discharge lock and the recovered liquid is stored.

4 Claims, 1 Drawing Figure

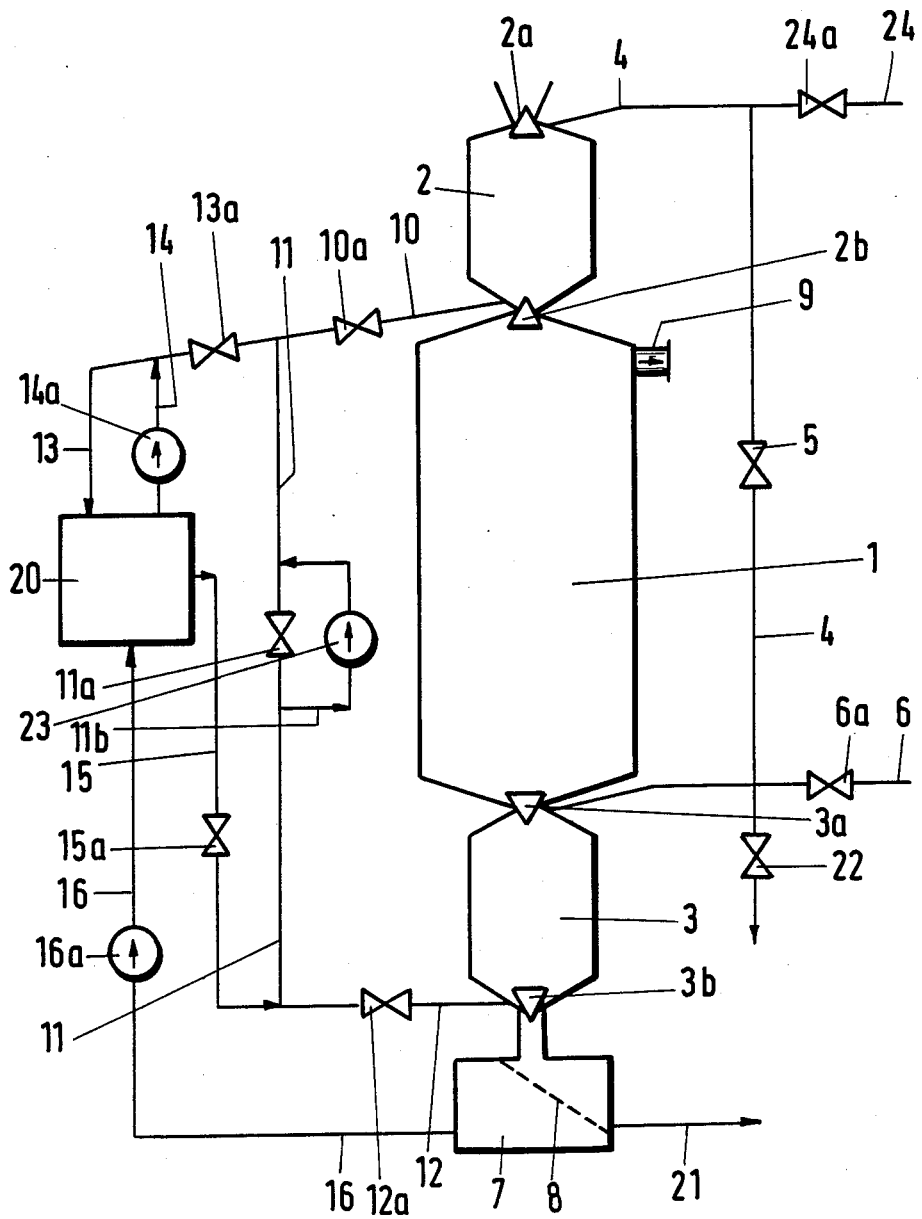

PROCESS OF FILLING AND EMPTYING A CONSTANTLY PRESSURIZED CONTAINER

FIELD OF THE INVENTION

This invention relates to a process of filling granular solids through an entrance lock chamber into a constantly pressurized container and of withdrawing solids from the container through a discharge lock chamber.

BACKGROUND OF THE INVENTION

It is known to provide entrance and discharge lock chambers. For a pressure relief of a lock chamber, the pressurizing gas may be discharged into the atmosphere or supplied to a storage tank. The pressurization and pressure relief of such known lock chambers take a relatively long time.

OBJECT OF THE INVENTION

It is an object of the present invention to provide an improved process of filling granular solids through a lock chamber and, particularly, to permit a pressurizing and pressure relief to be effected within a short time.

SUMMARY OF THE INVENTION

This object is attained in accordance with the invention in that (A) the entrance lock chamber when it is in a pressure-relieved state and open toward the outside is filled with solids and is then virtually completely filled up with liquid and is sealed, (B) the discharge lock chamber when it is in a closed state and filled with solids and with gas under a pressure which is approximately as high as the superatmospheric pressure in the container is connected to the entrance lock chamber through a gas line and an equalization of pressure is effected, (C) the liquid is conducted from the entrance lock chamber through a liquid line to the discharge lock chamber and is caused to displace the gas from the discharge lock chamber through the gas line to the entrance lock chamber, whereafter the liquid line and the gas line are closed, (D) the solids are transferred from the entrance lock chamber into the pressurized container while gas from the container is supplied to the entrance lock chamber to pressurize the latter, (E) the discharge lock chamber is pressure-relieved, liquid and solids are supplied to a separator and separated liquid is supplied to a storage tank, (F) the discharge lock chamber is filled with liquid and subsequently the gas line is opened and an equalization of pressure between the entrance and discharge lock chambers is effected, (G) liquid is transferred from the discharge lock chamber through the open liquid line to the entrance lock chamber so that the gas in the entrance lock chamber is displaced into the discharge lock chamber, (H) the liquid line and the gas line are closed and solids from the pressurized container are transferred through an opened outlet to the discharge lock chamber, and (I) the entrance lock chamber is pressure-relieved and opened toward the outside and the liquid from the entrance lock chamber is supplied to the storage tank.

In the process in accordance with the invention one or the other of the two lock chambers is filled with water so that only a very small quantity of gas is required for pressurizing the lock chamber. That small quantity of gas can be pressure-relieved quickly and the almost incompressible liquid is quickly pressure-relieved too. The process is particularly desirable when a contact of the liquid, such as water, with the solids to be supplied to the interior of the container and with the solids to be removed from the container will readily be permissible.

The entrance lock chamber and the discharge lock chamber preferably have approximately the same volumetric capacity so that the quantity of liquid delivered from the entrance lock chamber will be substantially sufficient to fill the discharge lock chamber. The gas which is employed suitably consists at least predominantly of the gas atmosphere in the container because when the container is opened to the entrance lock chamber or discharge lock chamber that gas will flow into the lock chamber concerned.

BRIEF DESCRIPTION OF THE DRAWING

The sole FIGURE of the drawing is a flow diagram of an apparatus for practicing the process of the invention.

SPECIFIC DESCRIPTION

The main components of the plant are the constantly pressurized container 1, which may consist of a reactor, the entrance lock chamber 2 and the discharge lock chamber 3. A gas line 4 provided with a valve 5 can be used for an equalization of pressure between the two lock chambers. A liquid line is composed of the line sections 10, 11 and 12. A storage tank 20 is also provided, which is connected to liquid lines 13, 14, 15 and 16. An inlet valve 2a or 3a and an outlet valve 2b or 3b are associated with each lock chamber. A separator 7 comprising a sieve 8 is disposed below the discharge lock chamber 3. A discharge line 9 for product gas is connected to the container 1.

The plant has the following mode of operation: It may be assumed that in an initial state the container 1 is under a superatmospheric pressure, the entrance lock chamber 2 is pressure-relieved and open toward the outside and the discharge lock chamber 4 is filled with solids and with gas under a pressure which is approximately as high as the superatmospheric pressure in the container 2. The valve 3a is closed. Now granular solids are supplied through the open valves 2a to the entrance lock chamber and liquid is subsequently supplied through the open valve 10a to the lock chamber 2 in such a quantity that the lock chamber 2 is virtually completely filled. The liquid comes from the storage tank 20 and flows into the lock chamber 2 through the line 14, which incorporates a pump 14a, and through the open valve 13a and the line 10. The valve 5 is then opened to effect an equalization of pressure between the two lock chambers 2 and 3. Because the lock chamber 2 is virtually completely filled with solids and liquid, the equalization of pressure will be effected by a flow of a very small quantity of gas through the line 4 to the lock chamber 2.

Liquid is conducted from the entrance lock chamber 2 to the discharge lock chamber 3 through lines 10, 11 and 12, which contain the now open valves 10a, 11a and 12a. Near that end which is adjacent to the lock chamber 2, the line 10 contains a sieve, not shown, which prevents a transfer of solids from the lock chamber 2 into the line 10. Under the action of the liquid flowing into the discharge lock chamber 3 the gas contained in said lock chamber is displaced virtually completely into line 4 and the entrance lock chamber 2. When the discharge lock chamber 3 has been virtually completely filled with liquid, the valves 12a and 5 are closed.

The entrance lock chamber 2 is pressurized to the superatmospheric pressure which is maintained in the container 1. The solids are contained in a gas atmosphere and in contact with a small quantity of adherent liquid. The valve 2b is now opened so that the solids can flow into the container 1. A certain quantity of the gas atmosphere contained in the container 1 now enters the entrance lock chamber. The same gas pressure is maintained in the container and in the lock chamber 2.

The discharge lock chamber 3, which is virtually completely filled with solids and liquid, is now pressure-relieved to about 1 bar. This may be effected in that the valve 6a in line 6 is opened. Line 6 may lead, e.g., to a gas storage tank, which is not shown. When the discharge lock chamber 3 has been pressure-relieved, the valve 3b is opened and liquid and solids flow to the separator 7. Solids are retained by the sieve 8 and withdrawn through line 21. The solids-free liquid is supplied by means of the pump 16a through line 16 to the storage tank 20. When the valve 3b has been closed, the discharge lock chamber 3 which has been pressure-relieved and emptied is filled up with liquid, which flows from the storage tank 20 through the line 15, the opened valve 15a and the line 12, which incorporates the opened valve 12a. That liquid displaces the air from the discharge lock chamber through the opened valve 22. When the valves 12a and 22 have been closed the valve 5 is opened to effect an equalization of pressure between the entrance lock chamber 2 and the discharge lock chamber 3. In order to provide only a gas atmosphere in the lock chamber 3, all liquid is pumped by the pump to the entrance lock chamber 2 so that the gas atmosphere from the lock chamber 2 is entirely displaced into the discharge lock chamber 2. In that operation the liquid flows through the line 12, which incorporates the opened valve 12a, through the line 11 provided with the bypass 11b, and through the line 10, which incorporates the opened valve 10a. When only a gas atmosphere is contained in the discharge lock chamber 3, the vlves 5 and 12a are closed. When the valve 3a is then opened, solids, such as the reaction residue, can flow from the container 1 into the discharge lock chamber 3 while the valve 3b is closed.

The entrance lock chamber 2 is now completely filled with liquid and is under a pressure which is approximately as high as the superatmospheric pressure maintained in the container 1. The lock chamber 2 is now pressure-relieved and the small quantity of gas released for the pressure relief is supplied to a gas storage tank, not shown. The line 6 may be connected to that supply tank. When the entrance lock chamber 2 has been pressure-relieved, the valve 2a is opened and the liquid is discharged from the lock chamber 2 to the storage tank 20 through lines 10 and 13 so that the initial state has been restored.

The process may be used, e.g., during an extracting treatment of natural materials, such as oil seeds, coffee, tea, etc. In that case the liquid employed may consist of water or of a different liquid because the natural materials are suitably wetted with suitable solvents before the extraction.

Besides, the process can be used also in connection with the treatment of other solids in pressure reactors, provided that a suitable liquid is available and the solids-liquid separation described hereinbefore involves only a reasonable expenditure.

We claim:
1. A method of filling a container while continuously under a superatmospheric pressure with flowable granular solids and removing flowable granular solids from said container, said method comprising the steps of:
   (a) introducing said flowable granular solids into an entrance lock chamber which is open and in a pressure-relieved state, and then substantially completely filling said chamber with a liquid and sealing said entrance lock chamber;
   (b) connecting a discharge lock chamber, containing flowable granular solids in a closed state and under a pressure of a gas approximately as high as the pressure in said container, with said entrance lock chamber by a gas line to equalize pressures between said chambers;
   (c) conducting liquid from said entrance lock chamber to said discharge lock chamber through a liquid line, thereby displacing gas from said discharge lock chamber to said entrance lock chamber through said gas line, and thereafter closing said lines;
   (d) transferring said flowable granular solids from said entrance lock chamber to said container while supplying gas from said container to said entrance lock chamber to pressurize said entrance lock chamber;
   (e) relieving pressure in said discharge lock chamber and transferring liquid and solids therefrom to a liquid/solid separator from which separated liquid is supplied to a storage tank.;
   (f) thereafter filling said discharge lock chamber with liquid and opening said gas line to effect pressure equalization between said chambers;
   (g) subsequently opening said liquid line to transfer liquid from siad discharge lock chamber to said entrance lock chamber and displace gas from said entrance lock chamber to said discharge lock chamber;
   (h) thereafter closing said lines and transferring the flowable granular solids from said container to said discharge lock chamber; and
   (i) relieving pressure in said entrance lock chamber and transferring liquid therefrom to said storage tank.

2. The method defined in claim 1 wherein said chambers have the same volumetric capacity.

3. The method defined in claim 1 wherein the gas in said chambers and said gas line corresponds in composition to a gas atmosphere in said container.

4. The method defined in claim 1 wherein said liquid is water.

* * * * *